United States Patent
Christensen et al.

(10) Patent No.: US 8,979,019 B2
(45) Date of Patent: Mar. 17, 2015

(54) AIRCRAFT TAXI SYSTEM INCLUDING DRIVE CHAIN

(75) Inventors: Donald J. Christensen, Phoenix, AZ (US); Louie T. Gaines, Phoenix, AZ (US); David L. Charles, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 488 days.

(21) Appl. No.: 13/192,084

(22) Filed: Jul. 27, 2011

(65) Prior Publication Data

US 2013/0026284 A1   Jan. 31, 2013

(51) Int. Cl.
B64C 25/50   (2006.01)
B64C 25/40   (2006.01)

(52) U.S. Cl.
CPC ............. B64C 25/405 (2013.01); *Y02T 50/823* (2013.01)
USPC ....................... 244/50; 244/100 R; 244/103 S

(58) Field of Classification Search
CPC ...... B64C 25/405; B64C 25/24; B64C 25/30; Y02T 50/54
USPC ................. 244/50, 103 R, 104 R, 103 S, 111
See application file for complete search history.

(56) References Cited

U.S. PATENT DOCUMENTS

| | | | | |
|---|---|---|---|---|
| 2,472,641 A * | 6/1949 | Wood | ........................ | 244/100 C |
| 2,493,275 A * | 1/1950 | Thornton | ...................... | 180/221 |
| 3,005,510 A * | 10/1961 | Phillips | ........................ | 180/14.7 |
| 3,762,670 A * | 10/1973 | Chillson | ........................ | 244/50 |
| 3,807,664 A * | 4/1974 | Kelly et al. | ..................... | 244/50 |
| 3,850,389 A | 11/1974 | Dixon | | |
| 4,596,300 A * | 6/1986 | Mankey | .......................... | 180/58 |
| 6,719,275 B1 * | 4/2004 | Waterson | ...................... | 254/333 |
| 2006/0065779 A1 * | 3/2006 | McCoskey et al. | ........ | 244/100 R |
| 2007/0158497 A1 * | 7/2007 | Edelson et al. | ............ | 244/103 S |
| 2009/0218440 A1 * | 9/2009 | Dilmaghani et al. | ........... | 244/50 |
| 2009/0294577 A1 | 12/2009 | Roques et al. | | |
| 2010/0252675 A1 | 10/2010 | Malkin et al. | | |
| 2011/0180659 A1 * | 7/2011 | Elliot et al. | ..................... | 244/50 |

FOREIGN PATENT DOCUMENTS

| | | | |
|---|---|---|---|
| DE | 3327628 A1 * | 2/1985 | |
| GB | 2088794 A * | 6/1982 | |
| WO | 2005/031184 A1 | 4/2005 | |

* cited by examiner

*Primary Examiner* — Rob Swiatek
*Assistant Examiner* — George Andonyan
(74) *Attorney, Agent, or Firm* — Shimokaji IP

(57) ABSTRACT

An aircraft taxi drive system includes a motor that is configured to transfer power to an aircraft wheel via a drive chain, such that the motor rotates the aircraft wheel via the drive chain. In some examples, the drive chain is movable between first and second positions. In the first position, the drive chain, such as an exterior surface of the drive chain, is engaged with a driven sprocket that is mechanically connected to an aircraft wheel. In the second position, the drive chain is disengaged from the driven sprocket.

15 Claims, 9 Drawing Sheets

AIRCRAFT TAXI SYSTEM INCLUDING DRIVE CHAIN

TECHNICAL FIELD

This disclosure relates to aircraft, and, more particularly, aircraft taxi systems.

BACKGROUND

Aircraft may perform taxiing maneuvers on the ground, e.g., travelling from a terminal to the runway or vice versa. In some systems, propulsion for the aircraft while taxiing is provided by thrust from the main engines or a tow cart.

SUMMARY

In general, this disclosure relates to devices, systems, and techniques for taxiing an aircraft or otherwise moving the aircraft on the ground without reliance on the thrust of the main engines of the aircraft (e.g., engines used to provide thrust during flight or takeoff) to propel the aircraft. An aircraft taxi drive system that is separate from the main engines provides the energy that is used to move the aircraft on the ground. In some examples, the aircraft taxi drive system includes a motor that is configured to transfer power to an aircraft wheel via a drive chain, such that the motor rotates the aircraft wheel via the drive chain, which may result in movement of the aircraft on the ground. In some examples, the drive chain (e.g., an exterior surface of the drive chain) is configured to be disengaged from the aircraft wheel, e.g., during aircraft takeoff, landing, and other times taxiing of the aircraft is not necessary or desired, and reengaged when taxiing is desirable (e.g., after landing). In some examples, the motor and drive chain may be sized to fit on an existing land gear assembly of an aircraft, and may allow the taxi drive system to be retrofitted onto existing aircraft.

In one example, the disclosure is directed to a system comprising a motor configured to generate a mechanical output, a drive sprocket configured to be driven by the motor, a drive chain mechanically connected to the drive sprocket, an aircraft wheel and a driven sprocket mechanically connected to the aircraft wheel. The drive sprocket is configured to transfer the mechanical output from the motor to the drive chain. An exterior surface of the drive chain is configured to engage with the driven sprocket to transfer the mechanical output of the motor to the driven sprocket and the aircraft wheel. Rotation of the driven sprocket is configured to rotate the aircraft wheel.

In another example, the disclosure is directed to a system comprising means for providing a mechanical output, an aircraft wheel, means for transferring the mechanical output to the aircraft wheel, and means for moving the motor and the transferring means relative to the aircraft wheel to bring the transferring means into and out of engagement with the aircraft wheel.

In another example, the disclosure is directed to a method comprising engaging an exterior surface of a drive chain with a driven sprocket that is mechanically connected to an aircraft wheel, rotating the aircraft wheel by transferring a mechanical output of a motor to the driven sprocket and aircraft wheel via the drive chain, and disengaging the drive chain from the driven sprocket.

The details of one or more examples of the disclosure are set forth in the accompanying drawings and the description below. Other features, objects, and advantages will be apparent from the description and drawings, and from the claims.

DETAILED DESCRIPTION

Figure 1:
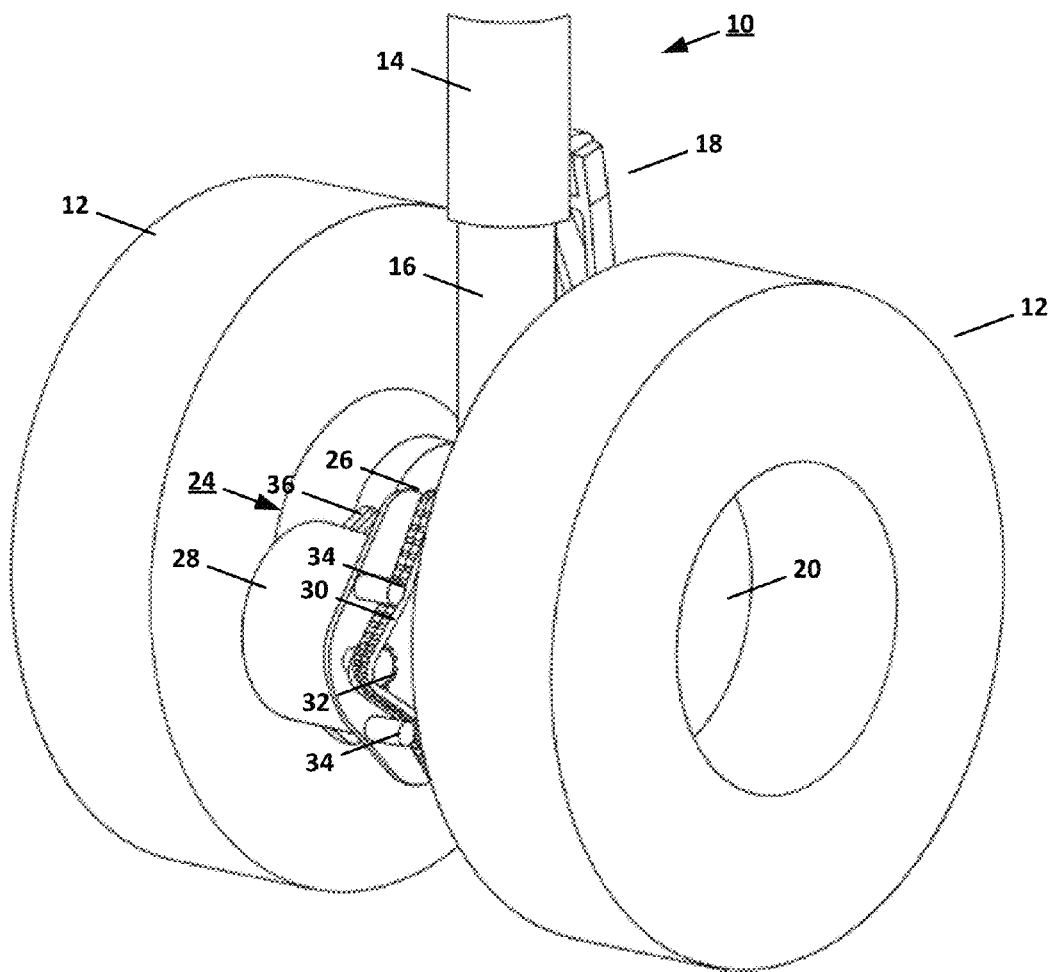
FIG. 1 is a perspective diagram illustrating an example aircraft landing gear assembly equipped with an example taxi drive system that includes a motor and drive chain.

The present disclosure describes example aircraft taxi drive systems that can be used to propel an aircraft on the ground, e.g., to taxi the aircraft on the ground from one point to another. The example aircraft taxi drive system is carried by the aircraft and includes a motor that is separate from the main engines (e.g., jet engines) of the aircraft, such that the propulsion of the aircraft during taxiing is independent of the main engines used during flight. The main engines provide the thrust required during take-off of the aircraft and during flight, whereas the motor of the taxi drive system is configured to provide an output that drives an drive chain, which, when engaged with an aircraft wheel, rotates the wheel during taxiing.

In some existing aircraft taxi systems, the output of the main engines propels the aircraft during the taxiing of the aircraft. Reversing capability may be provided by thrust reversers on the one or more turbine engines of the aircraft or by reversing the pitch of the propellers on a prop plane. The low power settings for jet engines required during taxi maneuvers can be inefficient, and may result in the waste of hundreds of gallons of fuel for each modern commercial airliner every day. Further, the use of the main jet engines near the terminal and other locations may be restricted. In such situations, a tow cart may be required to maneuver the jet aircraft on the ground. The use of the tow cart to move the aircraft on the ground may consume additional manpower and require special equipment.

The example aircraft taxi drive systems described herein allows an aircraft to taxi without reliance on the aircraft main engine(s) to provide thrust or without reliance on an external device, such as a tow cart. Because the example taxi drive system has a separate motor, the aircraft may be taxied while the main engines are shutdown or at idle. With the main engines idled or shutdown, the taxi drive system allows the aircraft to maneuver under its own power, e.g., near terminal buildings at an airport. In some examples, multiple taxi drive systems may be fitted onto the aircraft, allowing directional control, e.g., through the use of differential thrust from the taxi drive system. In other configurations, the taxi drive system may be mounted on a steerable landing gear assembly.

As discussed in further detail below, the example aircraft taxi drive systems described herein are configured such that they may each be relatively easy to retrofit an existing aircraft to include such a taxi drive system, e.g., the retrofitting may not require extensive modification to the aircraft. Retrofitting existing aircraft to include a taxi drive system separate from the main engines may include various considerations. For example, retrofitting taxi drive systems onto existing aircraft without extensive modification may be limited by the dimensions of the landing gear and the landing gear bays. The taxi drive systems described herein are relatively compact, which may increase the number of types of landing gear the taxi drive system may be retrofit onto.

Compounding the design challenges faced by a taxi system is the environment the taxi system operates in. During takeoff and landing, the rotation rate of the aircraft wheels is extremely high. Thus, permanent attachment of a taxi drive system to the aircraft wheels may require mass intensive transmission or clutch systems in order to protect the taxi drive system from damage due to the torque generated by the speeds involved. The example taxi drive systems described herein is configured to engage and disengage with the aircraft wheels, e.g., by rotation or translation of the taxi drive system between a first position, in which the taxi drive system is engaged with the aircraft wheel, and a second position, in which the taxi drive system is disengaged from the aircraft wheel. In some examples, a taxi drive system includes a looped drive chain configured such that an exterior of the looped drive chain transfers torque to the aircraft wheels when the system is in the first position. By using the exterior of the drive chain loop, the drive chain loop can be relatively easily engaged or disengaged from the aircraft wheel (e.g., moved to the second position) without a complex clutch system that may be required if the interior of the loop of the drive chain was used as the engagement site.

Extra mass taken up by such a taxi drive system that includes a transmission or clutch system may decrease fuel efficiency of the aircraft and, in some cases, may reduce the passenger or cargo capability of the aircraft due to the extra space required to accommodate the taxi drive system. The example taxi drive systems described herein is able to engage or disengage as unit, allowing the use of a pivot or a translating linkage or assembly, potentially simplifying the structure and saving mass.

Also, the landing gear assembly of the aircraft may be exposed to environmental contaminants, such as dirt, melted rubber, and other contaminants. Consequently, some existing taxi drive systems that are positioned near the landing gear may be sealed from the presence of contaminants, potentially leading to a heavier taxi drive system. In contrast, the example taxi drive systems described herein may be capable of functioning robustly despite the presence of contaminants, such that enclosures for the taxi drive systems described can be, but need not be, used.

FIG. 1 is a perspective diagram illustrating an example aircraft landing gear assembly 10 equipped with an example taxi drive system 24. An aircraft may be equipped with one or more landing gear assemblies 10, which can include respective one or more taxi drive systems 20 (e.g., one taxi drive system per landing gear assembly or per wheel of a landing gear assembly). In other examples, only a subset of the landing gear assemblies of an aircraft may be equipped with a respective taxi drive system 24. In the example shown in FIG. 1, landing gear assembly 10 comprises aircraft tires 12, cylinder 14, piston 16, torque arm 18, and hub 20. In addition, in the example shown in FIG. 1, taxi drive system 24 comprises plate 26, motor 28, drive chain 30, drive sprocket 32, spacers 34, actuator mount 36, and armature mount 38.

Figure 3:
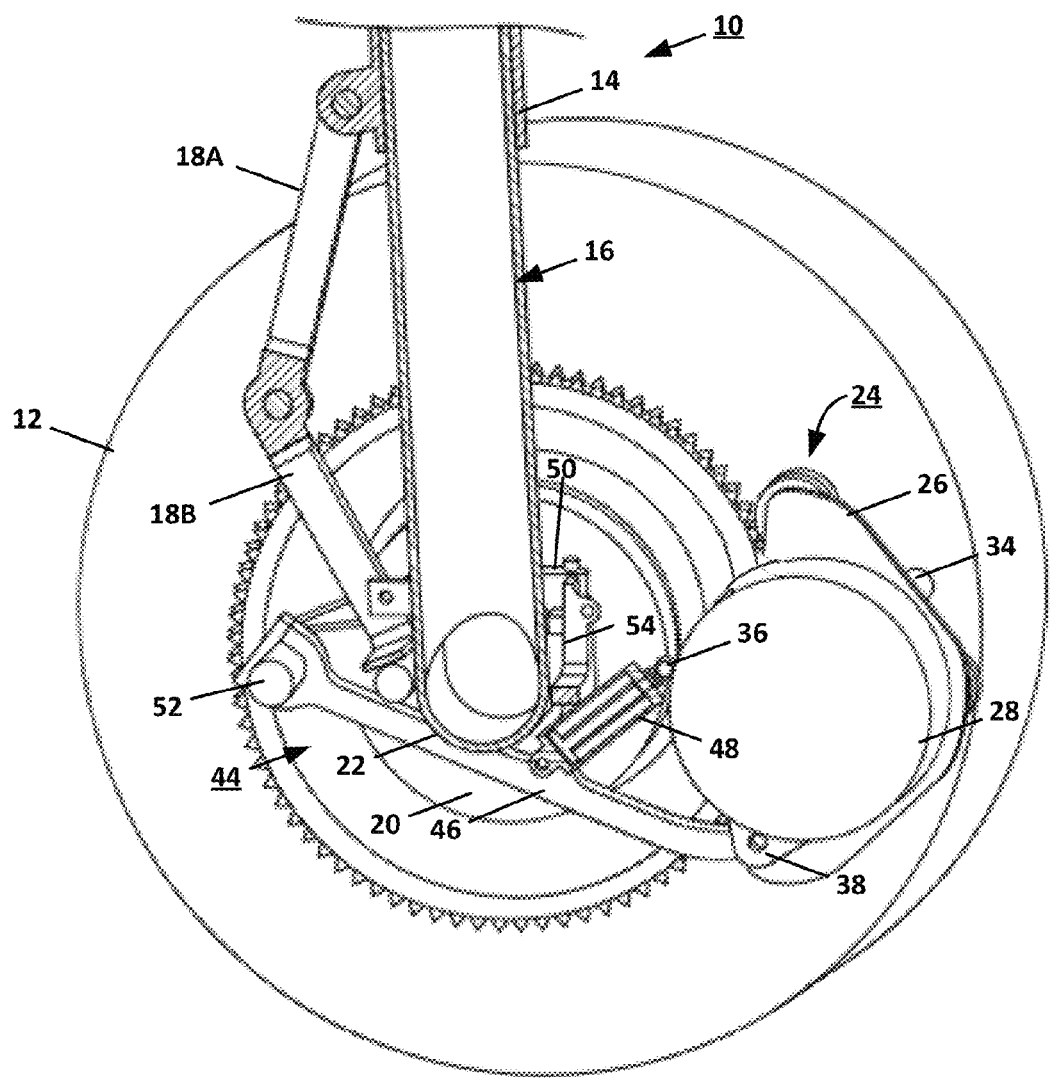
FIG. 3 is a cutaway diagram illustrating the example aircraft landing gear assembly and taxi drive system of FIG. 1.

Taxi drive system 24 may be located on one or more landing gear assemblies 10. In the example shown in FIG. 1, taxi drive system 24 is installed between aircraft tires 12 opposite torque arm 18. In some examples, taxi drive system 24 may be mechanically coupled to landing gear assembly 10 via an armature, e.g., armature assembly 30 (FIG. 3), and axle housing 22 (FIG. 3). In other examples, taxi drive system 24 may be connected to other points on landing gear assembly 10. In addition, other mechanisms can be used to mechanically connect taxi drive system 24 to landing gear assembly 10. As discussed in further detail below, actuator mount 36 may provide a connection point allowing taxi drive system 24 to be moved between a first position, in which drive chain 30 is engaged with aircraft wheel 10, and a second position, in which drive chain 30 is disengaged from aircraft wheel 10, via armature system 44.

Two aircraft tires 12 are depicted in the example configuration of landing gear assembly 10 depicted in FIG. 1, but landing gear assembly 10 may be equipped with one or more aircraft tires 12 in other examples. Hub 20 is configured to support aircraft tires 12 on an axle (not shown) connected through axle housing 22 to piston 16. An independent braking system (not shown), e.g., a brake disc stack and brake actuator, may be co-located with taxi drive system 24 on (e.g., directly or indirectly mechanically connected to) landing gear assembly 10 at or near aircraft tires 12. In other examples, taxi drive system 24 may be located on one or more landing gear assemblies 10 while an independent braking system may be equipped on other landing gear assemblies of the aircraft. In some examples, one or more of landing gear assemblies 10 may be steerable to provide directional control over the taxiing aircraft. In addition, or instead, steering for the taxiing aircraft may be controlled by using differential braking or differential thrust from multiple landing gear assemblies 10 equipped with respective taxi drive systems 20.

Cylinder 14 and piston 16 may be configured to provide shock absorption for landing gear assembly 10. Cylinder 14 may, for example, comprise a hydraulic cylinder in some examples. In these examples, upon impact with the ground during landing, aircraft tires 12 may drive piston 16 into cylinder 14, increasing the hydraulic pressure within the landing gear system. The motion of hydraulic fluid through cylinder 14, caused by the pressure of landing, may absorb at least some of the impact of the landing and slow the movement of piston 16 into cylinder 14. In the example shown in FIG. 1, torque arm 18 is a jointed arm connected to cylinder 14 and a point at the base of piston 16, e.g., at axle housing 22 for the axle supporting aircraft tires 12. Torque arm 18 is jointed, which allows piston 16 to extend and retract relative to cylinder 14 with the takeoff and landing of the aircraft, while also helping to prevent piston 16 from rotating in cylinder 14, thereby maintaining the alignment of the aircraft tires 12 with the direction of travel of the aircraft.

Motor 28 is configured to provide motive force to taxi drive system 24 by rotating drive sprocket 32. Drive sprocket 32 may be engaged with drive chain 30, which may form a loop that is configured to surround drive sprocket 32. As drive sprocket 32 rotates, the loop formed by drive chain 30 also moves. When taxi drive system 24 is in a first position, driven sprocket 42, which is mechanically connected to hub 20, is engaged with the exterior of the loop formed by drive chain 30. Driven sprocket 42 is mechanically connected to hub 20 such that as driven sprocket 42 rotates, hub 20 rotates (e.g., driven sprocket 42 can be in a fixed position relative to hub 20). Thus, as the loop formed by drive chain 30 moves, the motion is transferred to driven sprocket 42 (FIG. 2) and aircraft tires 12, causing the aircraft to taxi. Because drive chain 30 is only engaged with a part of driven sprocket 42 and does not loop around driven sprocket 42, the concern that drive chain 30 may come loose from sprocket 42 is minimized; as discussed below, an actuation system or the like holds drive chain 30 in engagement with driven sprocket 42, and may also hold taxi drive system 24 in a fixed position relative to driven sprocket 42 in both the first and second positions.

In situations when taxi drive system 24 may be exposed to relatively high torques or rotation rates from aircraft tires 12, taxi drive system 24 may be configured to move to a second position, e.g., rotated or pivoted out of engagement with driven sprocket 42, such that drive chain 30 does not engage with driven sprocket 42. Taxi drive system 24 may be reengaged with driven sprocket 42 to taxi the aircraft by moving taxi drive system 24 to the first position in which drive chain 30 is engaged with driven sprocket 42.

Motor 28 is configured to generate torque that can be used to propel the aircraft when the aircraft is on the ground, e.g., to taxi the aircraft. Motor 28 can be powered using any suitable source. In some examples, motor 28 may comprise or consist of an electric motor. Power for an electric motor may be drawn from any suitable source, such as directly from the electrical system of the aircraft, e.g., the auxiliary power unit (APU) of the aircraft, and routed along landing gear assembly 10, or from a battery or other power source of taxi drive system 10 and separate from the main electrical system of the aircraft. An APU may be configured to provide energy for functions other than propulsion of the aircraft, such as to start the main engines or to power lights on the aircraft. In other examples, motor 28 may be powered by a fuel, such as, for example the aviation fuel used to power the main engine(s) of the aircraft during flight. In some examples, a fuel line supplying motor 28 may be routed along landing gear assembly 10, e.g., the fuel line may traverse from the aircraft fuselage to motor 28 along landing gear assembly 10. In addition or instead, motor 28 may be a hydraulic motor powered by, for example, the hydraulic system of the aircraft. In other configurations taxi drive system 24 may have an independent electricity, hydraulic fluid, or fuel source located on landing gear assembly 10 or the fuselage of the aircraft.

In some, but not all, examples, motor 28 may include a transmission or gear box, which may help increase the torque outputted by motor 28 to drive sprocket 32. The gear ratio in the gearbox or transmission may be fixed or selectable, e.g., via crew member input. In some examples, the rotation rate of motor 28, and, therefore, the rate at which wheel 12 is rotated by motor 28, may be controlled by crew member input. For example, if motor 28 comprises an electric motor, a crew member of the aircraft may control the rotation rate of motor 28, and speed of the taxiing aircraft, by varying the voltage or current supplied to motor 28. Motor 28 may be used to taxi in reverse by reversing the polarity of the voltage or current supplied to motor 28.

Motor 28 can be mechanically connected to drive sprocket 32 using any suitable configuration. In the example shown in FIG. 1, plate 26 supports motor 28, drive sprocket 32, and spacers 34, e.g., motor 28, drive sprocket 32, and spacers 34 may be directly or indirectly mechanically connected to a surface of plate 26. Accordingly, in the example shown in FIG. 1, motor 28 is mechanically connected to drive sprocket 32 via plate 26 in the example shown in FIG. 1. In some examples, plate 26 may hold motor 28, drive sprocket 32, and idler sprockets 40 (FIG. 2) in fixed positions relative to each other. In other configurations, plate 26 may be configured to allow one or more of drive sprocket 32 or idler sprockets 40 to translate relative to each other, allowing the tension in drive chain 30 to be adjusted or engaged/disengaged with driven sprocket 42. Plate 26 may be configured to withstand the forces generated by the interaction of drive chain 30, idler sprockets 40, and the landing gear assembly 10 of the aircraft. Plate 26 may be constructed of any suitable material, such as, but not limited to, an alloy of aluminum or steel.

As discussed in further detail below, plate 26 provides a relatively simple and lightweight mechanism by which taxi drive system 24 can be moved between a first position and a second position because, in some examples, movement of plate 26 causes movement of drive chain 30 away from driven sprocket 42.

In some examples, plate 26 may be paired with a second plate that is positioned on the other side of drive chain 30 from plate 26, such that the opposing plates enclose drive chain 30 and help prevent drive chain 30 from slipping off of idler sprockets 40 and drive sprocket 32 by limiting the potential movement of drive chain 30 relative to drive sprocket 32 and idler sprockets 40. In addition, in some examples, plate 26 may help prevent the passage of environmental contaminants to drive chain 30 and drive sprocket 32 by at least partially covering chain 30 and sprocket 32. In some examples, additional plating may be added to form a container around drive chain 30, and one side may be left exposed provide room for drive chain 30 to engage with driven sprocket 42 of landing gear assembly 10.

Drive chain 30 may be mechanically connected to drive sprocket 32, e.g., looped around drive sprocket 32 such that at least some of the teeth of drive sprocket 32 engage with drive chain 30. For example, teeth of drive sprocket 32 may be positioned within gaps defined by drive chain 30 (e.g., holes in the links of a chain). In some examples, taxi drive system 24 includes spacers 34, which are configured to help prevent drive chain 30 from loosening or sliding out of engagement with drive sprocket 32. Spacers 34 may also support a second plate 26 (not shown) that, together with plate 26, sandwiches drive sprocket 32 and drive chain 30, which may further help prevent drive chain 30 from slipping loose from drive sprocket 32. Spacers 34 may comprise any suitable material, for example, an alloy of steel, aluminum, or titanium.

Figure 2:
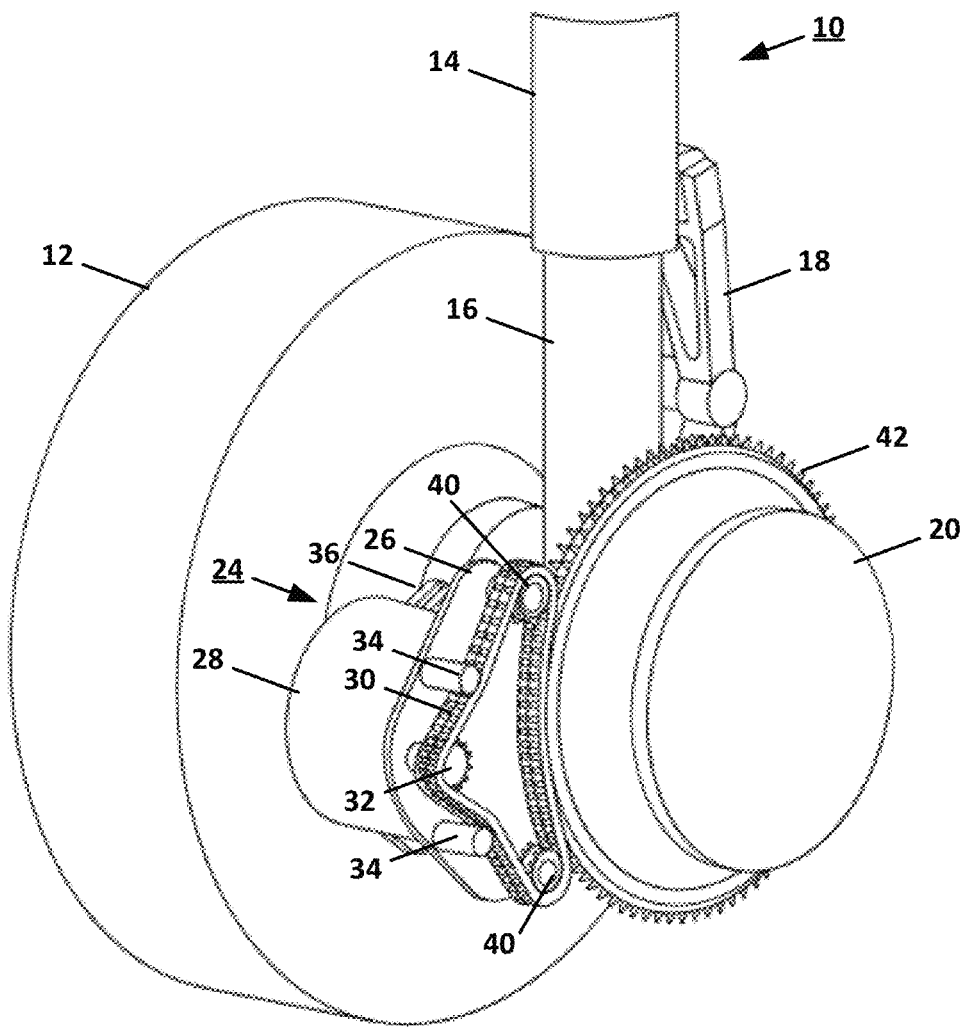
FIG. 2 is a perspective diagram illustrating the example aircraft landing gear assembly of FIG. 1 with an aircraft wheel removed, and also illustrates the example taxi drive system of FIG. 1.

Drive chain 30 may be made of any suitable material, for example an alloy of steel or titanium. Drive chain 30 may form a loop, encompassing drive sprocket 32 and idler sprocket 40 (FIG. 2). Drive chain 30 may comprise engagement sites located on both the interior and exterior surfaces of the loop formed by drive chain 30, surface 30A and 30B (FIG. 2) respectively. An interior surface of the loop may face drive sprocket 32 while an exterior surface may face away from drive sprocket 32. Engagement sites on the interior of the loop formed by drive chain 30 may allow drive sprocket 32 to engage with, and transfer power through, drive chain 30 by pulling and/or rotating drive chain 30. Engagement sites on the exterior of the loop formed by drive chain 30 may allow driven sprocket 42 (FIG. 2) to engage with, and be driven by, drive chain 30. The engagement sites of drive chain 30 may, for example, be formed by the links of drive chain 30. Other types of drive chains are contemplated. For example, in some examples, drive chain 30 may comprise a flexible belt and engagement sites may be provided by raised teeth on both sides of the belt.

As discussed above, motor 28 is configured to rotate drive sprocket 32. In some examples, drive sprocket 32 may be mechanically connected to motor 28, and an incorporated transmission or gearbox, if present, via a drive shaft that penetrates through plate 26. The drive shaft may be configured to transfer the rotational output of motor 28, and any incorporated gear box/transmission, to drive sprocket 32. Drive sprocket 32 may have one or more sets of teeth that are configured to engage with drive chain 30. Drive chain 30 and sprocket 32 may be configured to remain engaged with each other during operation of taxi drive system 24, and, in some examples, when taxi drive system 24 is in both the first and second positions. For example, in some examples, drive chain 30 may be prevented from slipping off drive sprocket 32 by tension in the loop formed drive chain 30 around drive sprocket 32 and idler sprockets 40 (FIG. 2). In some examples, a second plate positioned on the other side of drive chain 30 from plate 26 may also prevent drive chain 30 from slipping out of engagement with drive sprocket 32 by sandwiching drive sprocket 32, and drive chain 30, between plate 26 and the second plate.

Spacers 34 may provide support and spacing to allow drive sprocket 32 and idler sprockets 40 to rotate between two plates 26. In the example shown in FIG. 1, spacers 34 guide drive chain 30 around drive sprocket 32 and idler sprockets 40 by pinching the sides of the loop formed by drive chain 30 inwards, forcing drive chain 30 to engage a larger portion of the circumference of drive sprocket 32 than would be engaged with a taut loop stretched from drive sprocket 32 to idler sprockets 40. Increasing the portion of drive sprocket 32 engaged with drive chain 30 may reduce the amount of wear on drive sprocket 32 and drive chain 30 as well as decrease the incidence of slippage between drive sprocket 32 and drive chain 30.

Drive chain 30 may be brought into and removed from engagement with driven sprocket 42, i.e., moved between first and second positions. In the disengaged position (also referred to herein as the second position for ease of description), the teeth of driven sprocket 42 may not contact the engagement sites on the exterior of the loop formed by drive chain 30. Drive chain 30 may move into the disengaged position by rotating or translating taxi drive system 24 as a unit by an actuation system. Similarly, drive chain 30 may be brought into engagement with driven sprocket 42 (moved to the first position) by translating or rotating taxi drive system 24 as unit until the teeth of driven sprocket 42 meshes with the exterior of the loop formed by drive chain 30.

Actuator mount 36 provides a connection point for an actuation system, e.g., a hydraulic ram, electric ballscrew, or acme lead screw drive, that mechanically connects to taxi drive system 24. Aircraft tires 12 may rotate at relatively high speeds during takeoff and landing of the aircraft, e.g., based on movement of the aircraft primarily or solely attributable to the main engines of the aircraft. Thus, at some points during operation of the aircraft, aircraft tires 12 may be driven by forces not generated by taxi drive system 24. Transmission of the high rotating speeds to taxi drive system 24 may affect the integrity of the taxi drive system 24, such as by causing drive chain 30 and drive sprocket 32 to rotate at relatively high speeds. To help reduce or even prevent transmission of high rotating speeds of aircraft tires 12, e.g., during takeoff and landing of the aircraft, to taxi drive system 24, taxi drive system 24 may be selectively engaged and removed from engagement (i.e., disengaged) with driven sprocket 42 and aircraft tires 12.

In some examples, taxi drive system 24 is movable between a first position, in which drive chain 30 is engaged with driven sprocket 42, and a second position, in which drive chain 30 is disengaged from driven sprocket 42, by an actuator connected to actuator mount 36. When drive chain 30 is disengaged from driven sprocket 42, rotation of drive chain 30 by drive sprocket 32 is not translated to driven sprocket 42, such that driven sprocket 42 does not rotate with drive chain 30. In some examples, motor 28, drive sprocket 32, drive chain 30, plate 26, and idler sprockets 40 may be moved between the first and second positions as a single unit. For example, motor 28, drive sprocket 32, drive chain 30, plate 26, and idler sprockets 40 may have fixed positions relative to each other and may be movable relative to driven sprocket 42. In other examples, only a part of taxi drive system 24 may be moved between the first and second positions, e.g., only plate 26 (and, therefore, drive chain 30 and drive sprocket 32).

In some examples, taxi drive system 24 may pivot into and out of engagement with driven sprocket 42. In the example shown in FIG. 1, force applied, for example by a hydraulic ram or other actuator (e.g., hydraulic ram 48 (FIG. 3) or an electric screw drive), at actuator mount 36 may cause taxi drive system 24 to rotate about a pivot, e.g., armature mount 38, and engage or disengage with driven sprocket 42. In some examples, actuator mount 36 may be located on the casing of motor 28. In other examples, actuator mount 36 may be located on plate 26. In other examples, taxi drive system 24 may be translated radially or linearly into and out of engagement with driven sprocket 42. Instead, or in addition, taxi drive system 24 may be translated radially, e.g., translated along a radius of driven sprocket 42, into or out of engagement.

Armature mount 38 provides a connection point for a support linking taxi drive system 24 to landing gear assembly 10. Armature mount 38 may be configured to provide a pivot point about which taxi drive system 24 may be rotated between a first position, in which drive chain 30 is engaged with driven sprocket 42, and a second position, in which drive chain 30 is disengaged from driven sprocket 42, by an actuator connected to actuator mount 36. In other examples, armature mount 38 may provide a connection between taxi drive system 24 and a linear bearing system, or other translation means, allowing taxi drive system 24 to be maneuvered into and out of engagement with driven sprocket 42. In some examples, armature mount 38 may be located on the casing of motor 28. In other examples, armature mount 38 may be located on plate 26.

Landing gear assembly 10 may have other configurations in other examples. For example, landing gear assembly 10 can include other types of tire and hub arrangements, other axle arrangements, and the like. Taxi drive system 24 can be used with any suitable aircraft landing gear assembly 10.

FIG. 2 is a perspective diagram illustrating aircraft landing gear assembly 10, with an aircraft tire 12 removed, and taxi drive system 24. As shown in FIG. 2 and described above with respect to FIG. 1, hub 20 supports aircraft tire 12. Hub 20 may be mechanically connected to driven sprocket 42, which is depicted in FIG. 2 as being engaged with drive chain 30 (e.g., taxi drive system 24 is in the first position), causing hub 20 and aircraft tire 12 to rotate with driven sprocket 42. Hub 20 may also be connected to an axle linking the pair of aircraft tires 12 and hubs 20, e.g., through axle housing 22 (FIG. 3) at the base of piston 16. Driven sprocket 42 may be mechanically connected to hub 20 using any suitable technique. In some examples, hub 20 and driven sprocket 42 are formed from a single, continuous material such that they are an integral piece of material. As an example, driven sprocket 42 may be machined as part of hub 20. In other examples, driven sprocket 42 may be physically separate from hub 20 and mechanically connected to hub 20, e.g., bolted or riveted to hub 20, or connected to hub 20 via the axle supporting hub 20 and aircraft tires 12. Other configurations are also contemplated.

Also shown in FIG. 2 are idler sprockets 40, which are mounted on plate 26. Taxi drive system 24 can include one or more idler sprockets 40. As discussed above with respect to FIG. 1, idler sprockets 40 are configured to engage with drive chain 30 to help maintain tension of drive chain 30 to allow driven sprocket 42 to engage drive chain 30. In addition, idler sprockets 40 can help shape the loop formed by chain 30 and expand or shrink the loop of drive chain 30 to change the length of drive chain 30 that is configured to engage with driven sprocket 42. In some cases, it may be desirable to maximize a length of drive chain 30 that engages with driven sprocket 42 may increase the life span of drive chain 30 and driven sprocket 42, as well as reduce the possibility of drive chain 30 slipping out of engagement with driven sprocket 42. In other cases, it may be desirable to reduce the length of drive chain 30 that engages with driven sprocket 42 in order to reduce the total size of taxi drive system 24 and may ease the engagement/disengagement of drive chain 30 with driven sprocket 42. Idler sprockets 40 may rotate under the influence of drive sprocket 32 and drive chain 30.

In the example depicted in FIG. 2, idler sprockets 40 are depicted positioned in a triangular arrangement with drive sprocket 32 at an apex and the base of the triangle oriented towards driven sprocket 42. This arrangement may prevent drive chain 30 from impinging on itself as drive chain 30 flexes towards drive sprocket 32 when chain 30 is brought into engagement with driven sprocket 42. In other examples, idler sprockets 40 may also be located at the position of spacers 34, which may help shape the path the loop of drive chain 30 follows and increase the proportion of drive sprocket 32 engaged with drive chain 30. In other examples, a single idler sprocket may be used to expand drive chain 30 to allow the exterior of drive chain 30 to be brought into engagement with driven sprocket 42.

Idler sprockets 40 may be configured to translate to maintain tension in drive chain 30, for example idler sprockets 40 may be mounted on a spring tensioned pivot arm (not shown). A minimum tension on drive chain 30 to prevent drive chain 30 from coming loose from idler sprockets 40 or drive sprocket 32 may be maintained. Other techniques can be used in addition to or instead of idler sprockets 40 in order to maintain contact between idler sprockets 40 and drive chain 30. For example, a tooth size of idler sprockets 40 may be selected to enable idler sprockets 40 to maintain contact with drive chain 30. In addition, or instead, a second plate 26 may sandwich drive chain 30 between a first plate 26 and help prevent disengagement with idler sprockets 40 and drive sprocket 32.

Driven sprocket 42 is configured to transfer the mechanical output of motor 28, transmitted via drive chain 30, to aircraft tire 12. In the example shown in FIG. 2, driven sprocket 42 is larger than drive sprocket 32, which may increase the torque outputted to aircraft tires 12. The size of driven sprocket 42 and driven sprocket 42 may be specific to the type of aircraft taxi drive system 24 is used with, and can be influenced by factors such as gear ratio, sprocket tooth stress, velocity limits for drive chain 30, and access restrictions around existing equipment in landing gear assembly 10. Driven sprocket 42 is depicted as equipped with a double row of teeth in FIG. 2. In other configurations, driven sprocket 42 may have one or more rows of teeth sized to engage with drive chain 30. Drive chain 30 may flex during engagement with driven sprocket 42 to partially follow the curvature of driven sprocket 42. By flexing to follow the curve of driven sprocket 42, drive chain 30 may reduce the individual stress on the teeth of driven sprocket 42, thereby helping to increase the life of driven sprocket 42 and reducing chances of slippage between driven sprocket 42 and drive chain 30.

A taxi drive system 24 equipped with drive chain 30 that is configured to engage with driven sprocket 42 may be advantageous over some geared drive systems in which two sprockets engage with each other to transfer mechanical output from a motor to aircraft tire 12. For example, the gear drive systems may require tighter tolerances in spacing of the teeth between gears than a drive chain-sprocket mesh requires, which may require the control of the gear drive system to be more precise (e.g., thereby increasing the cost of the taxi drive system). Further, the gear drive systems may require more extensive lubrication and contaminant protections than system 24 including drive chain 30. In addition, because drive chain 30 is relatively flexible relative to driven sprocket 42, the amount of wear to drive chain 30 and driven sprocket 42 due to relative motion between drive chain 30 and driven sprocket 42 during operation of the taxi drive system may be reduced relative to the amount of wear between two sprockets that more directly engage with each other (e.g., by meshing teeth).

FIG. 3 is a cutaway diagram illustrating an aircraft landing gear assembly 10 equipped with a taxi drive system 24. Taxi drive system 24 is equipped with an armature system 44, which supports taxi drive system 24 and allows taxi drive system 24 to be moved between the first and second positions. In the example shown in FIG. 3, armature system 44 comprises armature 46, hydraulic ram 48, piston mount 50, axle mount 52, and front support 54. Taxi drive system 24 is depicted as being connected to armature system 44 via armature mount 38 as a pivot. In other examples, taxi drive system 24 may be slidably connected to armature system 44 such that taxi drive system 24 can be linearly moved between the first and second position, or armature system 44 may radially translate taxi drive system 24 towards and away from driven sprocket 42. The pivot and radial translation may require less room for movement of taxi drive system 24 than the linear system.

Landing gear assembly 10 may comprise an axle housing 22 located at the base of piston 16. Axle housing 22 may support an axle (not shown) connecting aircraft tires 12 via respective hubs 20. Torque arm 18, depicted partially cutaway in FIG. 3, may connect cylinder 14 (FIG. 1) to the base of piston 16 and axle housing 22, preventing the rotation of piston 16 in cylinder 14 while allowing piston 16 to retract into cylinder 14 during landing. The joint between the upper and lower sections (18A and 18B respectively) of torque arm 18 is visible in FIG. 3. The lower section of torque arm 18 is depicted in FIG. 3 as pivotably connected to axle housing 22. In other embodiments, torque arm 18 may be connected to other locations on piston 16.

Taxi drive system 24 is in the first position in FIG. 3, in which drive chain 30 is engaged with driven sprocket 42 in FIG. 3. Armature 46 may comprise one or more rigid members extending below axle housing 22 and piston 16 to provide support for taxi drive system 24. Taxi drive system 24 and armature 46 may be pivotably connected via armature mount 38. In other examples, armature 46 may comprise a linkage allowing armature 46 to extend and retract, translating taxi drive system 24 radially into and out of engagement with driven sprocket 42. In further examples, taxi drive system 24 may be slidably connected to armature 46, allowing taxi drive system 24 to be translated radially or linearly into and out of engagement with driven sprocket 42 (e.g., between the first and second positions).

Armature 46 may be rigidly coupled to landing gear assembly 10. As depicted in FIG. 3, armature 46 may be connected to piston 16 via piston mount 50 and axle mount 52. By coupling armature 46 to landing gear assembly 10, armature 46 and taxi drive system 24 may be retrofitted onto existing aircraft landing gear 10 without requiring modification to the size and other components of aircraft landing gear 10.

In examples in which taxi drive system 24 pivots between the first and second positions, hydraulic ram 48 may provide the force that causes taxi drive system 24 to pivot between the first and second positions, into and out of engagement with driven sprocket 42. Hydraulic ram 48 may comprise actuator cylinder 48A and actuator piston 48B. Hydraulic ram 48 may be pivotably connected to armature 46 and actuator mount 36. In other configurations hydraulic ram 48 may be pivotably connected to front support 54. In some examples, hydraulic ram 48 may comprise a double acting hydraulic actuator. Hydraulic fluid may be routed through feed lines located on, for example, landing gear assembly 10 and connected to the hydraulic system of the aircraft. In other examples, another suitable mechanism in addition to or instead of hydraulic ram 48 can be used to pivot taxi drive system 24 between the first and second positions. For example, a pneumatic piston or an electric drive actuator, such as an electric ballscrew or acme lead screw drive, can be used to pivot taxi drive system 24 between the first and second positions.

Piston mount 50 is configured to couple armature assembly 30 to landing gear assembly 10 so that taxi drive system 24 is supported. Piston mount 50 may comprise a collar bolted around or otherwise attached to piston 16 above axle housing 22. Piston mount 50 may comprise two sections bolted or welded together, allowing piston mount 50 to be retrofitted onto existing landing gear assemblies. Piston mount 50 may connect to armature 46 via front support 54, providing support for armature 46 under the weight of taxi drive system 24 and torque loads resulting from rotating driven sprocket 42 and aircraft tires 12.

Axle mount 52 is configured to provide additional support to armature assembly 30 and taxi drive system 24, mechanically coupling armature assembly 30 to landing gear assembly 10 and helping to prevent or control motion of armature assembly 30. Axle mount 52 may be mechanically coupled to axle housing 22 and extend a rigid member radially away from axle housing 22 to connect to armature 46. In some examples, axle mount 52 may be rigidly connected to landing gear assembly 10. In other examples, axle mount 52 may be pivotably coupled to both armature 46 and axle housing 22. Pivotably coupling axle mount 52 to axle housing 22 may allow axle mount 52 to rotate and move armature 46, resulting in taxi drive system 24 being translated into and out of engagement with driven sprocket 42.

Front support 54 is configured to support armature 46 by linking armature 46 to piston mount 50. Front support 54 may comprise a rigid member connecting piston mount 50 and armature 46. Front support 54 may be rigidly connected to piston mount 50 and armature 46, providing support to armature 46 and taxi drive system 24. In some examples, front support 54 may be manufactured as part of armature 46. In addition, in some examples, front support 54 may be pivotably connected to armature 46 and piston mount 50, allowing armature 46 to translate taxi drive system 24 into and out of engagement with driven sprocket 42. Front support 54 may provide a mounting point for hydraulic ram 48.

Figure 4:
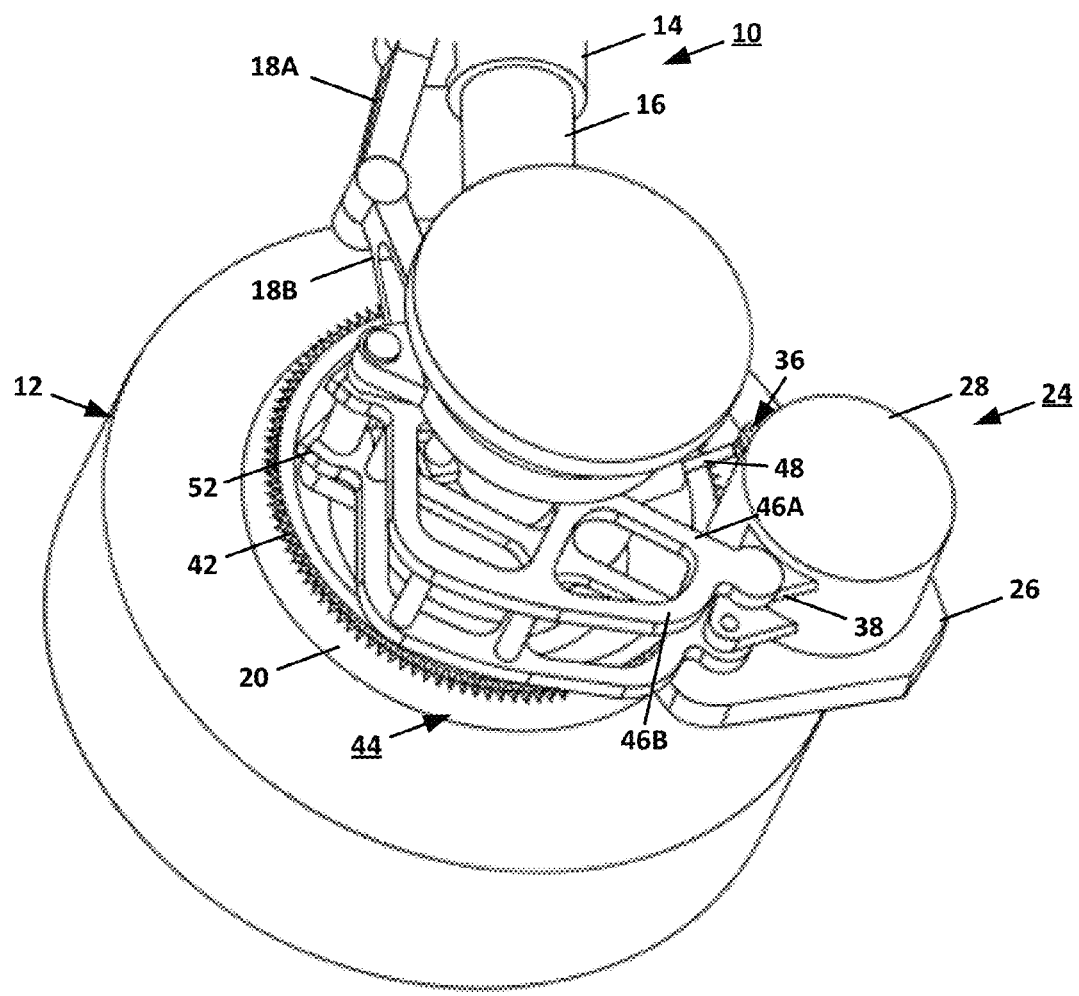
FIG. 4 is another perspective diagram of the example aircraft landing gear assembly of FIG. 1, with an aircraft wheel removed, and the taxi drive system of FIG. 1.

FIG. 4 is a perspective diagram illustrating aircraft landing gear assembly 10 and taxi drive system 24. One aircraft tire 12 of landing gear assembly 10 is not shown in FIG. 4, exposing taxi drive system 24 and armature system 44. In the example shown in FIG. 4, taxi drive system 24 is in the first position, such that drive chain 30 is engaged with driven sprocket 42.

As depicted in FIG. 4, some examples of armature system 44 may comprise one or more frames and bracings to increase the strength and stability of armature system 44 while minimizing weight. Armature system 44 may comprise armature 46, hydraulic ram 48, and axle mount 52. Piston mount 50 (FIG. 3) and front support 54 (FIG. 3) are not visible in FIG. 4. As shown in FIG. 4, armature 46 may comprise one or more rigid members 46A connected to axle mount 52 and armature mount 38. Armature 46 may further comprise bracing members 46B which form a frame with rigid members 46A, and may prevent armature 46 from flexing under the weight and torque of taxi drive system 24. The frames formed by one or more rigid members 46A and 46B may be connected together. Armature 46 may mechanically connect to, or be manufactured including, front support 54. Front support 54 may mechanically connect armature 46 to piston mount 50. Piston mount 50 may be bolted or otherwise mechanically connected to piston 16 or axle housing 22, linking armature 46 to landing gear assembly 10. Axle mount 52 may be coupled to axle housing 22 and provide further support for armature 46. Hydraulic ram 48, or another actuator type, may be mechanically coupled to piston mount 16, armature 46, or front support 54, and may be configured to apply a force at actuator mount 36 that causes taxi drive system 24 to move between the first and second positions.

Figure 5A:
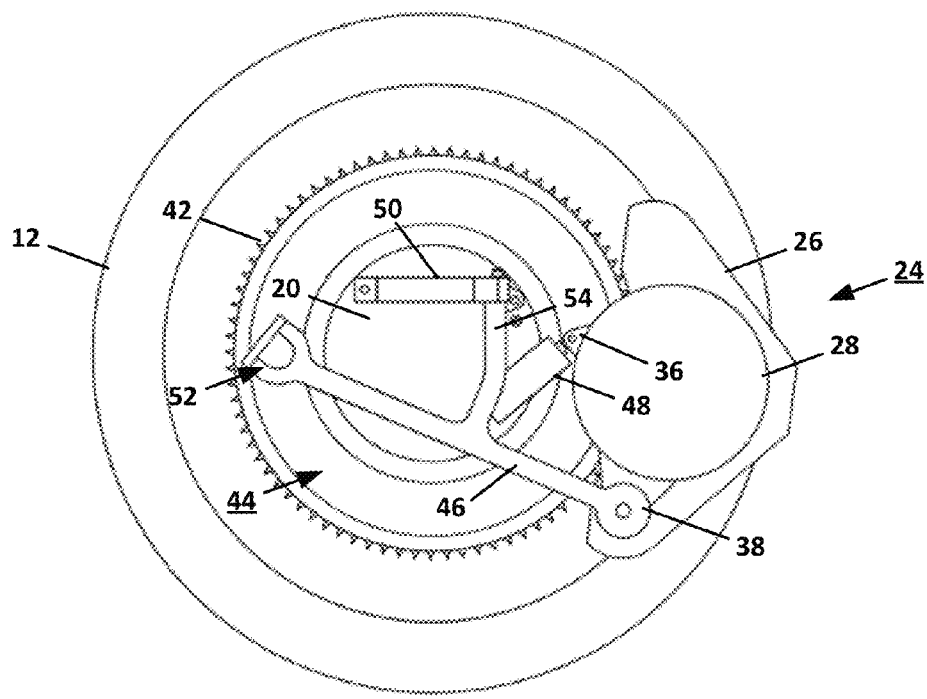
FIGS. 5A and 5B are cutaway diagrams illustrating the example taxi drive system of FIG. 1 in an engaged position.
Figure 5B:
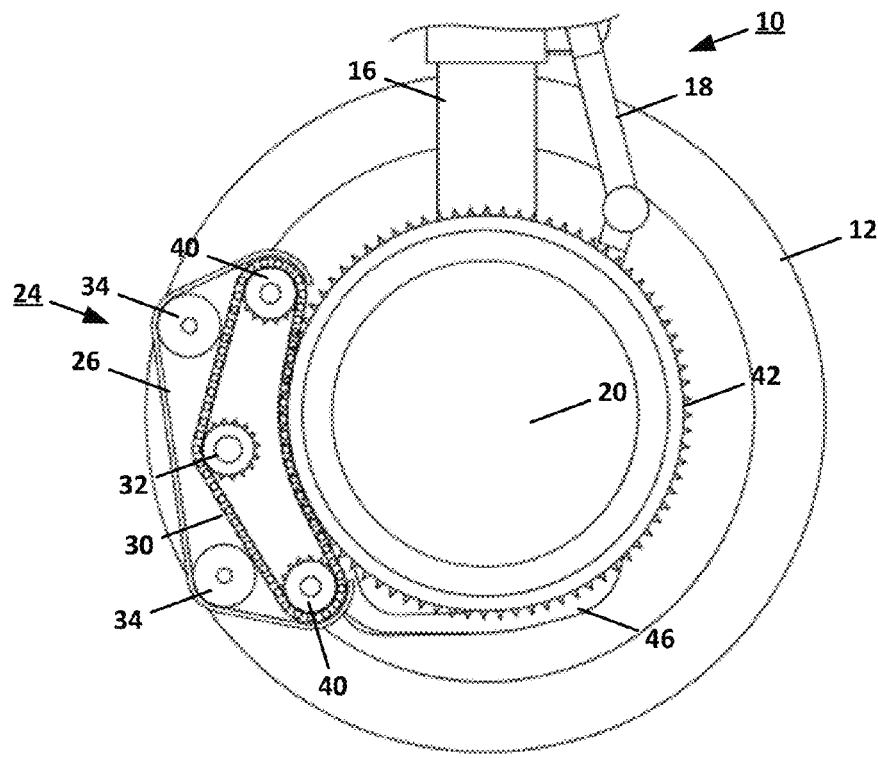

FIGS. 5A and 5B are cutaway diagrams illustrating taxi drive system 24 in the first position, in which drive chain 30 is engaged with driven sprocket 42 that is mechanically connected to hub 20. FIG. 5A depicts taxi drive system 24 and armature system 44, with landing gear assembly 10 removed, as viewed from the interior of the landing gear. Taxi drive system 24 is engaged with driven sprocket 42 and may transfer torque to aircraft wheel 12 to allow an aircraft to taxi.

In FIG. 5A, taxi drive system 24 is shown in the first (engaged) position. In the first position of taxi drive system 24, the teeth of driven sprocket 42 mesh with drive chain 30 and drive chain 30 pulls against the teeth of driven sprocket 42. To move system 24 into the first position by bringing drive chain 30 into engagement with driven sprocket 42, hydraulic ram 48 may retract and pull taxi drive system 24 from the second (disengaged) position to the first position.

FIG. 5B depicts taxi drive system 24 in the first position, in which drive chain 30 is engaged position with driven sprocket 42. An aircraft tire 12 is removed to better show the workings of taxi drive system 24. The perspective of the diagram is from the exterior of the landing gear system and in a direction substantially parallel to the axis of rotation of wheel 12.

In some examples, taxi drive system 24 may be rotated into engagement with driven sprocket 42. For example, taxi drive system 24 may pivot about armature mount 38 as force from hydraulic ram 48 is applied. In other configurations, taxi drive system 24 may be translated into and out of the first and second positions. In some examples, armature system 44 may comprise a linear bearing or bale that, when actuated, retracts, pulling drive system 24 into contact with driven sprocket 42, such that drive chain 30 meshes with driven sprocket 42. In addition, or alternatively, axle mount 52 may be pivotably coupled to armature 46 and axle housing 22. As axle mount 52 rotates away from taxi drive system 24, armature 46 is pulled towards landing gear assembly 10 and brings taxi drive system 24 towards driven sprocket 42. Front support 54 may be pivotably coupled armature 46 and piston mount 50, supporting armature 46 while allowing armature 46 to translate under influence of axle mount 52. Taxi drive system 24 may be rigidly coupled to armature 46, as the motion of armature 46 may be sufficient to bring taxi drive system 24 into engagement. A brace extending, for example, between actuator mount 36 and armature 46 or front support 54 may further support taxi drive system 24.

As discussed in further detail below, in some examples, prior to being moved into the first position, taxi drive system 24 may be activated to rotate drive chain 30, such that drive chain 30 is rotating when it is brought into engagement with driven sprocket 42. This may help reduce wear on drive chain 30 during engagement.

In some examples, idler sprockets 40 or spacers 34 may be movable to maintain a constant tension in drive chain 30. By using movable spacers 34 or idler sprockets 40 drive chain 30 may be installed in taxi drive system 24 with some slack. In the first (engaged) position, the slack in the loop formed by drive chain 30 is taken up by driven sprocket 42 impinging on the loop. By allowing drive chain 30 to conform to a portion of the curve of driven sprocket 42, the contact area and number of teeth of driven sprocket 42 engaged with drive chain 30 may increase, which may help reduce wear on drive chain 30 and driven sprocket 42. As taxi drive system 24 is disengaged, the slack in drive chain 30 may be taken up by movable idler sprockets 40 or spacers 34.

Figure 6A:
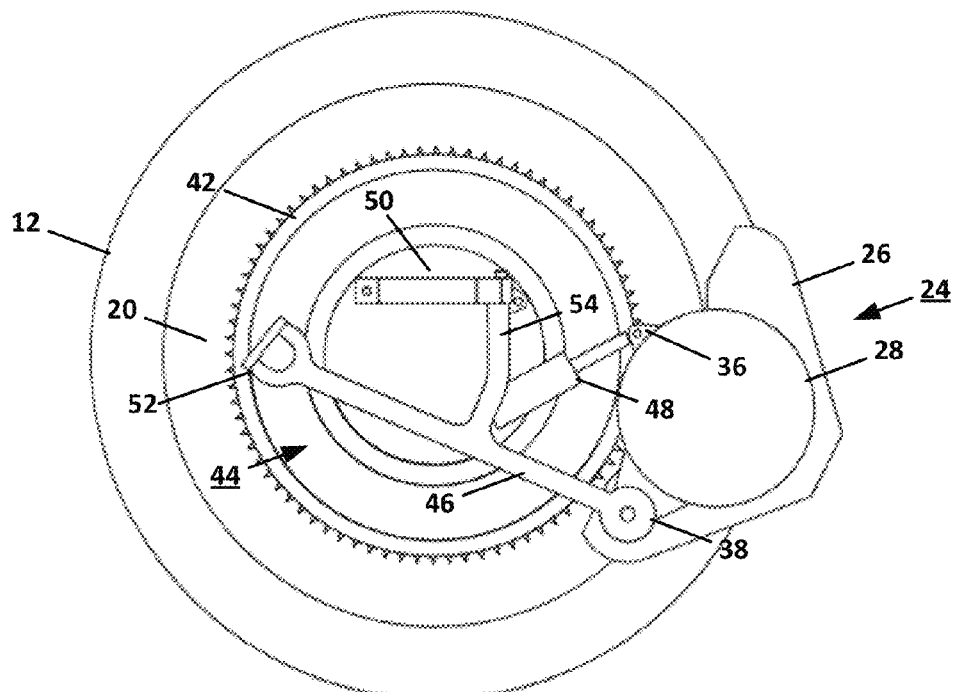
FIGS. 6A and 6B are cutaway diagrams illustrating the example taxi drive system of FIG. 1 in a disengaged position.
Figure 6B:
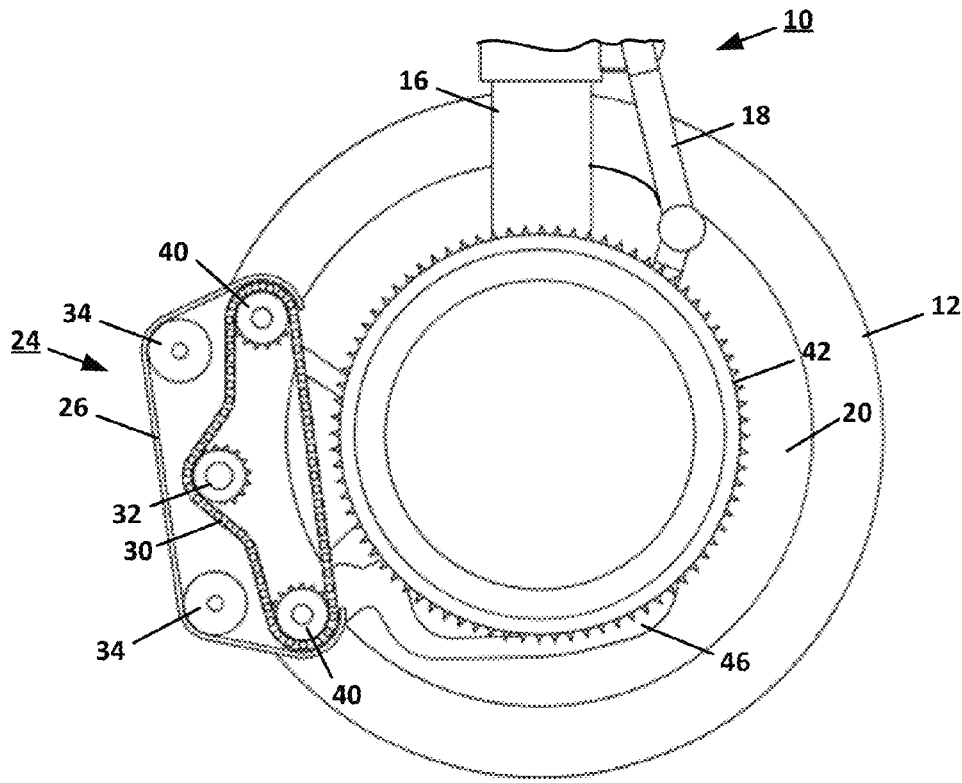

FIGS. 6A and 6B are cutaway diagrams illustrating a taxi drive system 24 in the second position. FIG. 6A depicts taxi drive system 24 in the second position. The perspective of FIG. 6B is substantially similar to that of FIG. 5B. An aircraft tire 12 is removed from FIGS. 6A and 6B to better show the workings of taxi drive system 24.

In the disengaged position, as shown in FIG. 6A, driven sprocket 42 and aircraft tires 12 rotate without influence from the influence of taxi drive system 24. The teeth of driven sprocket 42 do not mesh with drive chain 30. To move system 24 from the first position and into the second, hydraulic ram 48 may extend and push taxi drive system 24 into the second (disengaged) position from the first position. This may help limit or even eliminate the transfer of high rotational speeds of aircraft tires 12 (e.g., during takeoff and landing) to taxi drive system 24.

In other examples, taxi drive system 24 may be translated out of engagement with driven sprocket 42. For example, axle mount 52 may be pivotably coupled to axle housing 22 and armature 46. As axle mount 52 rotates towards taxi drive system 24, armature 46 may be forced to translate away from landing gear assembly 10 and move taxi drive system 24 out of engagement with driven sprocket 42. In other examples, armature 46 may comprise one or more linear bearings or bales that may extend and remove taxi drive system 24 from engagement with driven sprocket 42.

Because a force is no longer applied against drive chain 30 by driven sprocket 42 when taxi drive system 24 is in the second (disengaged) position, the loop formed by drive chain 30 may straighten at the site of the former engagement with driven sprocket 42, as shown in FIG. 6B. Tension in drive chain 30 may be maintained by idler sprockets 40 or spacers 34. For example, spacers 34 or idler sprockets 40 may shift to maintain tension. As an example, spacers 34 may be mounted on a pivot arm such that spacers 34 shift inwards, pinching drive chain 30 around drive sprocket 32, extending the path drive chain 30 travels around drive sprocket 32 and idler sprockets 40. In addition or instead, idler sprockets 40 may translate outwards, extending the distance between idler sprockets 40 and drive sprocket 32. In the disengaged position, driven sprocket 42 and aircraft tires 12 are free to rotate without interference from taxi drive system 24.

Figure 7:
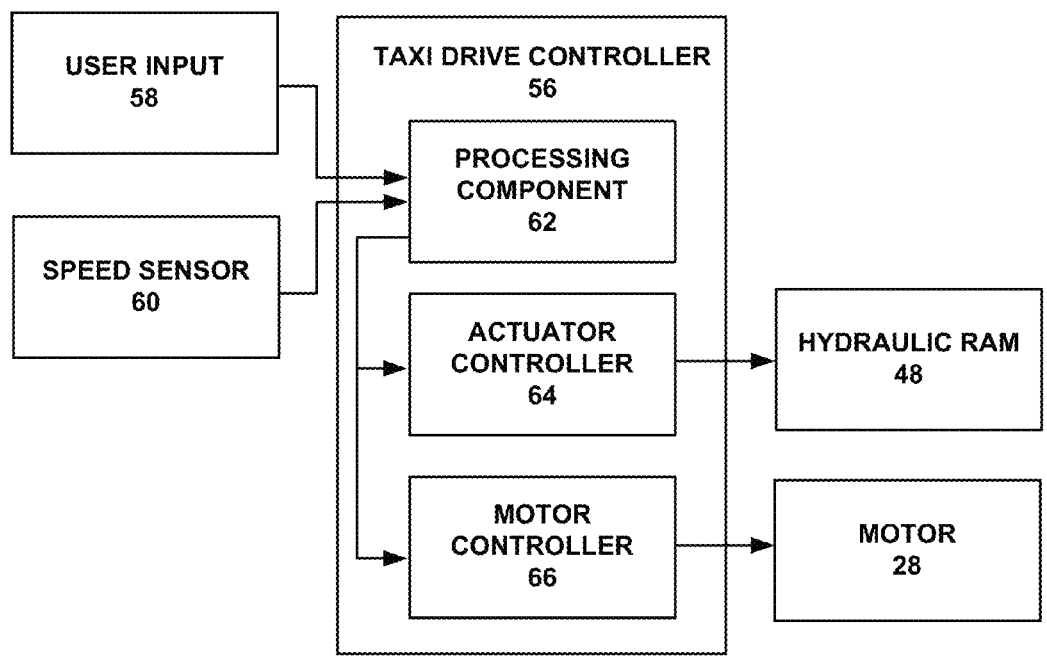
FIG. 7 is a functional block diagram illustrating an example taxi drive controller.

FIG. 7 is a schematic functional block diagram illustrating an example taxi drive controller 56, which is configured to control the operation of taxi drive system 24. Taxi drive controller can be located on an aircraft that includes taxi drive system 24, and may, for example, be implemented as part of the flight control hardware, software, firmware or stand-alone cockpit interface/controller hardware, firmware, hardware, or any combination thereof. In the example shown in FIG. 7, taxi drive controller 56 comprises processor 62, actuator controller 64, and motor controller 66. As shown in FIG. 7, taxi drive controller 56 can be configured to receive user input via user interface 58 and signals from speed sensor 60 and output commands to hydraulic ram 48 (or other actuator) and motor 28 to control ram 48 and motor 28.

Taxi drive controller 56 comprises any suitable arrangement of hardware, alone or in combination with software and/or firmware, to perform the techniques attributed to taxi drive controller 56 and taxi drive system 24. In various examples, taxi drive controller 56 can include any one or more microprocessors, digital signal processors (DSPs), application specific integrated circuits (ASICs), field programmable gate arrays (FPGAs), or any other equivalent integrated or discrete logic circuitry, as well as any combinations of such components. Although not shown in FIG. 7, taxi drive system 24 may also include a memory, which include any volatile or non-volatile media, such as a random access memory (RAM), read only memory (ROM), non-volatile RAM (NVRAM), electrically erasable programmable ROM (EEPROM), flash memory, and the like. The memory may store instructions for execution by taxi drive controller 56 that cause taxi drive controller 56 to perform the techniques attributed to taxi drive controller 56 herein. Although processor 62, actuator controller 64, and motor controller 66 are described and illustrated as separate modules of taxi drive controller 56, in some examples, processor 62, actuator controller 64, and motor controller 66 can be functionally integrated. In some examples, processor 62, actuator controller 64, and motor controller 66 correspond to individual hardware units, such as ASICs, DSPs, FPGAs, or other hardware units.

Taxi drive controller 56 is configured to receive user input via user interface 58 via wired or wireless communication. User interface 58, may be, for example, onboard the aircraft (e.g., in a cockpit of the aircraft) or remotely located. User interface 64 may include, for example, input buttons and/or a keypad and a display (e.g., a cathode ray tube (CRT) display, a liquid crystal display (LCD) or light emitting diode (LED) display). The keypad may take the form of an alphanumeric keypad or a reduced set of keys associated with particular functions. User interface 58 can additionally or alternatively include a peripheral pointing device, such as a mouse, via which a user may interact with user interface 58. Other examples of user input mechanism of user interface 58 include, but are not limited to, a joystick, a switch, a throttle, or a steering wheel/yoke inputs. In some examples, a display of user interface 58 may include a touch screen display, and a user may interact with controller 56 via the display.

User interface 58 is configured to receive input from a user, such as a pilot or crew of the aircraft, indicating various inputs for controlling taxi drive system 24. User interface 58 may provide the input to processor 62 of taxi drive controller 56 as, for example, electrical or optical signals. The user input can indicate, for example, a desired rotational speed of aircraft tires 12, allowing the user to control the speed of the taxiing aircraft via taxi drive system 24, or directional input, allowing the user to control the direction of the taxiing aircraft via taxi drive system 24, e.g., via differential steering using multiple taxi drive systems 24.

The user input received by processor 62 of controller 56 via user interface 58 may also comprise input indicating whether taxi drive system 24 should be moved to the first or second positions (e.g., input indicating whether taxiing of the aircraft is desirable). Thus, as shown in FIG. 7, in some examples, processor 62 can control actuator controller 64 to control hydraulic ram 48 (or another mechanism in other examples) to move taxi drive system 24 between the first and second positions, depending on the received user input.

Taxi drive controller 56 is also configured to receive input from speed sensor 60, which may be configured to generate a signal indicative of the rotation rate of driven sprocket 42. Speed sensor 60 may, for example, directly measure the rotation rate of driven sprocket 42 or may measure the rotation rate of a component connected to driven sprocket 42, such as hub 20, aircraft tire 12, or the axle supporting hub 20. In other examples, speed sensor 60 may measure the velocity of the aircraft. Speed sensor 60 may be included in taxi drive system 24 or the output from an existing wheel speed sensor in landing gear assembly 10 of the aircraft may be used. Processor 62 may receive the signal from speed sensor 60 and determine the rotation rate of driven sprocket 42 and the rotation rate of motor 28 that enables drive chain 30 to match the cross-radial velocity of driven sprocket 42.

Processor 62 of taxi drive controller 56 is configured to control motor 28 via motor controller 66. Motor 28 can be controlled, for example, to control the speed of taxiing of the aircraft. Thus, processor 62 can control motor controller 66 in some examples in response to user input received via user interface 58, where the user input may request an increase or decrease in speed of the taxiing aircraft. In some examples, processor 62 may determine the appropriate rotation rate of motor 28 based on the user input and control motor controller 66 to control motor 28 via the voltage supplied to motor 28, or by actuating a throttle or selecting a gear ratio of motor 28 or a transmission/gearbox incorporated into motor 28. In order to determine the appropriate rotation rate of motor 28, processor 62 may, for example, reference a look-up table or another data structure that associates a plurality of aircraft taxiing speeds with respective rotation rates of motor 28.

In some examples, processor 62 is configured to move taxi drive system 24 between the first and second positions in response to user input received via user interface 58. In other examples, processor 62 is configured to automatically move taxi drive system 24 between the first and second positions in response to a detected condition. For example, processor 62 can control actuator controller 64 to move aircraft taxi system 24 from the first position to the second position in response to detecting an aircraft speed greater than or equal to a stored threshold. The aircraft speed can be determined, for example, based on the signal generated by speed sensor 60. As another example, processor 62 can control actuator controller 64 to move aircraft taxi system 24 from the second position to the first position in response to detecting an aircraft speed less than or equal to a stored threshold.

Taxi drive controller 56 can be configured to control multiple taxi drive systems 24 of an aircraft, which can be installed on multiple landing gear assemblies, e.g., on the main landing gear of an aircraft. For example, processor 62 can independently control the rotation rates of the motors 28 of each of the taxi drive systems, thereby allowing the aircraft to be steered using the differential in rotation rates. In some examples, processor 62 can control into rotation rates for multiple taxi drive systems in order to steer the aircraft and taxi the aircraft at the speed, e.g., indicated by the user input based on user input received via user interface 58. Processor 62 can control the rotation rate of motor 28 (or multiple motors of respective taxi drive systems 24), and, therefore, the speed of the aircraft during taxiing, thereby allowing the speed of the aircraft during taxi to be controlled without reliance on aircraft friction brake systems, although the friction brake system could also be used.

Figure 8:
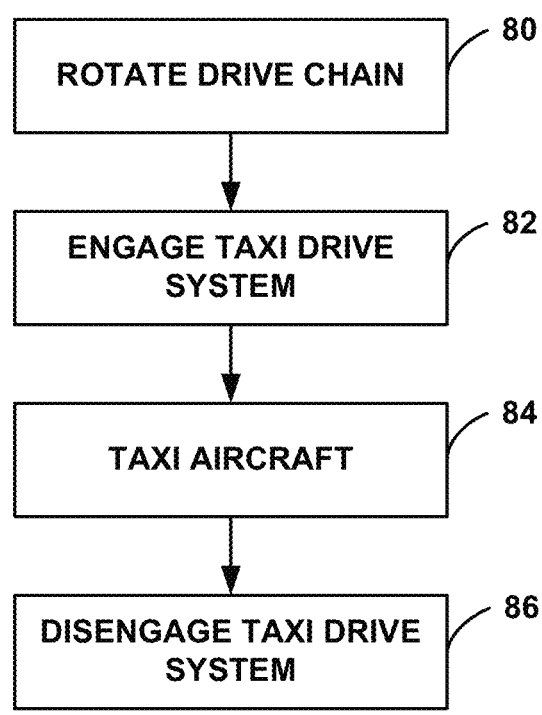
FIG. 8 is a flow diagram illustrating an example method of operating a taxi drive system.

FIG. 8 is a flow diagram illustrating an example method of operation of taxi drive system 24. The method shown in FIG. 8 includes rotating drive chain 30, e.g., to a speed that is based on a rotation of aircraft tire 12 (80), engaging taxi drive system 24 (82), taxiing aircraft (84), and disengaging taxi drive system 24 (86). Engaging or disengaging taxi drive system 24 (82, 86, respectively) may comprise pivoting taxi drive system 24 or translating taxi drive system 24.

In the example shown in FIG. 8, drive chain 30 can be rotated prior to engaging drive chain 30 with driven sprocket 42 (80). As discussed above, this may help reduce wear of drive chain 30 and/or driven sprocket 42 attributable to the friction between drive chain 30 and driven sprocket 42 as they are brought into engagement with each other. Processor 62 of taxi drive controller 56 can, for example, control motor controller 66 to rotate drive chain 30 to a speed that is based on a speed of aircraft tire 12, and, in some examples, is substantially equal to or equal to the speed of the aircraft tire 12. An example taxi drive system 24 may match the rotation rate of aircraft tire 12 within 10 revolutions per minute (rpm) or approximately 10 rpm. The disengaged drive chain 30 may be rotated at a slightly greater speed than driven sprocket 42 if aircraft tire 12 is rotating during engagement. The speed of the aircraft wheel can be determined using any suitable technique. In some examples, speed sensor 60 (FIG. 7) may be positioned to measure the rotation rate of aircraft tire 12, hub 20, or driven sprocket 42, while in other examples, existing wheel speed sensors aboard the aircraft may be used to monitor the rotation rate of aircraft tire 12, hub 20, or driven sprocket 42. Taxi drive controller 56 (FIG. 7) may receive the output of speed sensor 60 to determine the cross-radial velocity of the teeth of driven sprocket 42 based on the radius and the angular velocity/rotational frequency of driven sprocket 42. Taxi drive controller 56 may then control motor 28 and drive chain 30 based on the determined speed, e.g., to substantially match or match the cross-radial velocity of the teeth of driven sprocket 42.

One method of determining the rotation rate of drive sprocket 32 that may produce the velocity of drive chain 30 that matches the cross-radial velocity of driven sprocket 42 is to use the ratio of radius of driven sprocket 42 to drive sprocket 32 multiplied by the rotational frequency of driven sprocket 42. These calculations may be performed automatically by taxi drive controller 56 (e.g., processor 62 or another component) of taxi drive system 24 or the avionics of the aircraft. Upon determining a rotational rate for taxi drive system 24, the determined rotational rate may be used by taxi drive controller 56 to control motor controller 66 to accelerate motor 28 to the selected rotational rate before bringing taxi drive system 24 into engagement with driven sprocket 42.

In some examples, engaging taxi drive system 24 (82), i.e., moving taxi drive system to the first position, may comprise pivoting taxi drive system 24 into engagement with driven sprocket 42. Processor 62 of taxi drive controller 56 may, for example, control actuator controller 64 (FIG. 7) to control hydraulic ram 48 (FIGS. 3 and 7) to pivot taxi drive system 24 to the first position. Hydraulic ram 78 may be pivotably coupled to actuator mount 36 and armature 46 or front support 54. By retracting hydraulic ram 48, taxi drive system 24 may be pulled about armature mount 38 and into engagement with driven sprocket 42. Actuators that can be used instead of, or in addition to, hydraulic ram 48 include, but are not limited to, pneumatic pistons and electric drives, such as a ballscrew or acme lead screw drive. Pneumatic pistons may operate in a similar manner to hydraulic ram 48, using a double action cylinder to retract a piston and pull taxi drive system 24 into engagement. Electric screw drives may comprise a threaded rod and a threaded engagement device (e.g., a nut). Either the threaded rod or the threaded engagement device may be connected to taxi drive system 24. A motor may rotate the threaded rod or threaded engagement device. As the threaded rod or threaded engagement device rotates, the interaction of the threading produces a force that may pull taxi drive system 24 into the first position, such that drive chain 30 is engaged with driven sprocket 42.

In other examples, taxi drive controller 56 can engage taxi drive system 24 (82) by at least translating taxi drive system 24 into engagement with driven sprocket 42. For example, armature 46 (FIG. 3) may support or comprise a linear bearing system or other device configured to pull taxi drive system radially from a disengaged position into engagement with driven sprocket 42, and processor 62 of taxi drive controller 56 can control actuator controller 64 to move armature 46 in order to engage drive chain 30 with driven sprocket 42. In other examples, armature 46 may be pivotably connected to front support 54 (FIG. 3) and axle mount 52 (FIG. 3). Front support 54 may be pivotably connected to piston mount 50 (FIG. 3). A hydraulic actuator or motor may rotate axle mount 52 causing armature 46 to be pulled back, bring taxi drive system 24 into engagement with driven sprocket 42.

After engagement with driven sprocket 42, taxi drive system 24 may be used to taxi the aircraft (84). Under the control of processor 62, motor controller 66 can control motor 28 (FIG. 2) to rotate drive sprocket 32, driving drive chain 30 and rotating driven sprocket 42. Driven sprocket 42 may be connected to hub 20 (FIG. 1), causing aircraft tire 12 to rotate with driven sprocket 42. Motor controller 66 of taxi drive controller 56 (FIG. 7) may control motor 28 to generate a rotational rate determined, e.g., based on user input received via user interface 58 from a user (e.g., a pilot) regarding the desired speed of taxiing of the aircraft. Motor 28 may be equipped with a transmission or gear box. A transmission system may allow the gear ratio between drive sprocket 32 and motor 28 to be adjusted, which can adjust the rotational rate of motor 28.

In preparation for takeoff, landing, or when idle, taxi drive controller 56 can control taxi drive system 24 to be disengaged (86), i.e., moved to the second position. Disengagement may be controlled by actuator controller 64 of taxi drive controller 56 (FIG. 7) and may occur automatically or in response to user input 58. In some examples, processor 62 may control actuator controller 64 to disengage taxi drive system 24 by at least pivoting taxi drive system 24 out of engagement with driven sprocket 42. In one example, hydraulic ram 48 may extend, pushing taxi drive system 24 around armature mount 38 and clear of the teeth of driven sprocket 42. In the disengaged position aircraft tires 12 may rotate free of interaction with taxi drive system 24. Other configurations may use a pneumatic piston or electric screw drive in place of hydraulic ram 48.

In other examples, processor 62 may control actuator controller 64 to disengage taxi drive system 24 (86) by at least translating taxi drive system 24 out of engagement with driven sprocket 42. Armature 46 may support one or more hydraulic pistons, pneumatic rams, linear bearings, or similar devices configured to push taxi drive system 24 radially out of engagement with driven sprocket 42. Other examples may comprise rotating axle mount 52 to drive armature 46 towards taxi drive system 24. As armature 46 may be pivotably coupled to axle mount 52 and front support 54 (and piston mount 50 via front support 54), the motion of axle mount 52 may cause armature 46 to swing taxi drive system 24 out of engagement with driven sprocket 42.

Figure 9:
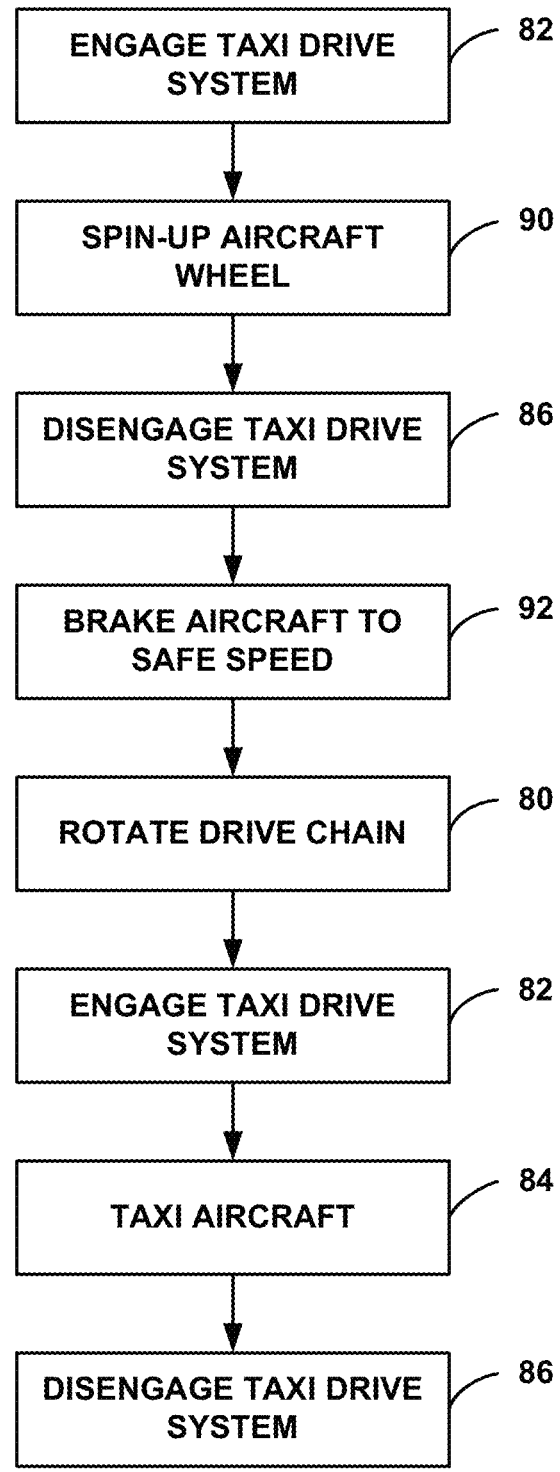
FIG. 9 is a flow diagram illustrating an example method of taxiing an aircraft with a taxi drive system that includes a motor and a drive chain that is selectively engageable with a wheel of the aircraft.

FIG. 9 is a flow diagram illustrating an example method for using taxi drive system 24. The method shown in FIG. 9 may comprise engaging taxi drive system 24 (82), spinning-up aircraft tire 12 (90), disengaging taxi drive system 24 (86), braking aircraft to safe speed (92), rotating drive chain 30 prior to engaging drive chain 30 with driven sprocket 42 (80), engaging taxi drive system 24 (82), taxiing aircraft (84), and disengaging taxi drive system 24 (86).

Taxi drive system 24 is configured to be disengaged prior to take off and landing. In some examples, taxi drive controller 56 (FIG. 7), as directed by user input receive via user interface 58 (FIG. 7), may control taxi drive system 24 to temporarily bring drive chain 30 into engagement with driven sprocket 42 prior to landing (82). For example, taxi drive system 24 may be used to "spin-up" aircraft tire 12 prior to touch down (90). Spinning up aircraft tire 12 prior to touch down comprises causing aircraft tire 12 to rotate at a relatively high speed, e.g., at or near the rate that aircraft tire 12 will rotate after impact with the runway. This may, for example, reduce the wear on the aircraft tires 12 by reducing the amount of skid on the runway resulting from a near stationary aircraft tire 12 being forced to suddenly rotate at speed. Taxi drive system 24 may be configured to rotate aircraft tire 12 at a higher rate for spin-up than for because the inertia of the aircraft may not encumber the ability of motor 28 to provide the desired output as much during spin-up compared to during taxiing. After obtaining the desired rotational rate during spin up, taxi drive controller 56 may cause taxi drive system 24 to be disengaged from driven sprocket 42, protecting drive chain 30 from being inadvertently rotated by contact with driven sprocket 42 during landing (86).

Upon landing, the aircraft may use thrust reversers and friction brakes to slow the aircraft (92). Once the aircraft has reached a desired speed threshold, e.g., approximately 25 knots, taxi drive controller 56 may control taxi drive system 24 to be moved to the first position, in which drive chain 30 is engaged with driven sprocket 42 (82). As discussed above with respect to FIG. 8, motor 28 may rotate drive chain 30 may be rotated to a speed that is based on a rotation rate of aircraft tires 12 or the current ground speed of the aircraft (80). By rotating drive chain 30 prior to engaging drive chain 30 with driven sprocket 42, wear and impact on taxi drive system 24 and driven sprocket 42 during engagement may be reduced. The wear and impact on taxi drive system 24 from being brought into engagement with driven sprocket 42 may be particularly low when drive chain 30 is rotated to a speed that substantially matches or matches the rotation rate of aircraft tires 12 or the current ground speed of the aircraft prior to engaging drive chain 30 with driven sprocket 42.

After matching rotation rates, taxi drive system 24 may be brought into engagement with driven sprocket 42 (82), e.g., under the control of taxi drive controller 56 of taxi drive system 24 or the avionics of the aircraft, and the aircraft may then begin taxiing under power from taxi drive system 24 (84). The speed at which the aircraft taxis may be controlled by the rotation rate of motor 28, and, in some examples, the selection of a gear ratio within the gear box or transmission of motor 28. The aircraft may be slowed by decreasing the rotation rate of motor 28 and/or using a braking mechanism, such as a brake disc stack. Directional control may be provided by installing taxi drive system 24 on multiple landing gear and rotating aircraft tires 12 at different rates on different landing gear, e.g., differential steering. In other examples, taxi drive system 24 may be installed on steerable landing gear assembly, for example the nose wheel of an aircraft. The steerable landing gear may be turned in the desired direction and taxi drive system 24 will apply force in the direction the steerable landing gear is oriented, causing the aircraft to turn. The rotational rate of taxi drive system 24 may be controlled by commands from the pilot or other crew member in the aircraft. These commands may be routed into the avionics of the aircraft or to taxi drive controller 56 of taxi drive system 24 which controls the rotation rate of motor 28.

Taxi drive system 24 may be disengaged from driven sprocket 42, i.e., moved to the second position (86), e.g., for maintenance, when aircraft is idling, or in preparation for takeoff. Maintenance may be facilitated by removing drive chain 30 from engagement with driven sprocket 42, removing the interference of driven sprocket 42 with the inspection or removal of drive chain 30. Prior to takeoff taxi drive system 24 may be disengaged to prevent affecting the integrity of system 24 from the relatively high rotational rates aircraft tires 12 may experience during the takeoff run. In some examples, taxi drive controller 56 can disengage taxi drive system 24 from driven sprocket 42 in response to a command from the pilot or a crew member of the aircraft. The command may be transmitted to the avionics of the aircraft or a processing component of taxi drive system 24 via user interface 58. In some examples, controller 56 can automatically cause taxi drive system 24 to be disengaged based on the rotation rate of aircraft tires 12 or driven sprocket 42 or based on exceeding a ground speed threshold (e.g., 25 knots or another predetermined operating speed) or increasing the throttle past a threshold indicating impending takeoff.

Various examples of the invention have been described. These and other examples are within the scope of the following claims.

The invention claimed is:

1. A landing gear drive system comprising:
   a piston;
   an axle;
   a mounting assembly fixedly connected to at least one of the piston and the axle;
   a driving assembly operably and fixedly connected to the mounting assembly to move between a first position and a second position, the driving assembly including;
   a motor configured to generate a mechanical output;
   a drive sprocket configured to be driven by the motor;
   a drive chain configured to form a closed loop and mechanically connected to the drive sprocket, wherein the drive sprocket is configured to transfer the mechanical output from the motor to the drive chain, and wherein the drive chain defines an interior surface on an inner circumference of the closed loop and an exterior surface on the outer circumference of the closed loop, the interior surface facing the drive sprocket;
   an aircraft wheel mounted on the axle; and
   a driven sprocket mechanically connected to the aircraft wheel, wherein the exterior surface of the drive chain is configured to engage with and rotate the driven sprocket to transfer the mechanical output of the motor to the driven sprocket and the aircraft wheel when the driving assembly is in the first position; and
   the drive chain is disengaged from the driven sprocket when the driving assembly is in the second position; and
   wherein rotation of the driven sprocket is configured to rotate the aircraft wheel.

2. The system of claim 1, further comprising a controller configured to control the motor to rotate, before the drive chain is brought into engagement with the driven sprocket, at a speed that is based on a rotational speed of the driven sprocket.

3. The system of claim 1, further comprising a controller, wherein the controller is configured to control a rotational speed of the motor and engagement of the drive chain with the driven sprocket based on user input.

4. The system of claim 1, wherein the driven sprocket includes a plurality of teeth configured to be positioned within gaps defined by the drive chain when the drive chain is engaged with the driven sprocket.

5. The system of claim 1, further comprising an actuator, wherein the actuator is configured to rotate the driving assembly about a pivot point between the first and second positions to engage and disengage, respectively, the drive chain from the driven sprocket.

6. The system of claim 1, further comprising a linear bearing, wherein the linear bearing is configured to translate the driving assembly relative to the driven sprocket to engage and disengage, respectively, the drive chain from the driven sprocket.

7. The system of claim 1, further comprising a linkage, wherein the linkage is configured to translate the driving assembly relative to the driven sprocket to engage and disengage the drive chain from the driven sprocket.

8. The system of claim 5, wherein the actuator comprises a hydraulic piston.

9. The system of claim 5, wherein the actuator comprises an electrically driven screw drive.

10. A method comprising:
    moving a driving assembly including a motor and a closed loop drive chain, and operably mounted to at least one of a piston and an axle of a landing gear of an aircraft, to a first position wherein an exterior surface of the closed loop drive chain is engaged with a driven sprocket that is mechanically connected to an aircraft wheel, the drive chain defining an interior surface on inner circumference of the closed loop and the exterior surface on the outer circumference of the closed loop, the interior surface facing a drive sprocket;
    rotating the aircraft wheel by transferring a mechanical output of the motor to the driven sprocket and aircraft wheel via the drive chain; and
    disengaging the drive chain from the driven sprocket by moving the driving assembly to a second position.

11. The method of claim 10, further comprising slowing an aircraft comprising the aircraft wheel to a speed of about 0 knots to about 25 knots prior to moving the driving assembly to the first position.

12. The method of claim 10, further comprising, prior to moving the driving assembly to a first position, rotating the drive chain at a speed that is based on a rotational speed of the driven sprocket.

13. The method of claim 10, wherein moving the driving assembly to the first position comprises moving the driving assembly radially towards the driven sprocket.

14. The method of claim 10, wherein moving the driving assembly to the first position comprises rotating the driving assembly towards the driven sprocket about a pivot point.

15. The method of claim 10, wherein moving the driving assembly to the first position and the second position comprises moving the driving assembly radially towards and away from, respectively, the driven sprocket.

* * * * *